United States Patent [19]

Minnick

[11] Patent Number: 4,927,596

[45] Date of Patent: May 22, 1990

[54] SELF-ACTUATING PRESSURE RELIEF DEVICE AND METHOD FOR NUCLEAR CONTAINMENT

[75] Inventor: Lawrence E. Minnick, Los Altos, Calif.

[73] Assignee: Electric Power Research Institute, Inc., Palo Alto, Calif.

[21] Appl. No.: 390,456

[22] Filed: Aug. 4, 1989

Related U.S. Application Data

[63] Continuation of Ser. No. 231,847, Aug. 12, 1988, abandoned.

[51] Int. Cl.$^5$ .............................................. G21C 9/00
[52] U.S. Cl. ................................... 376/283; 376/309; 261/126
[58] Field of Search ..................... 376/283, 309, 310; 261/121.1, 126

[56] References Cited

U.S. PATENT DOCUMENTS

| | | | |
|---|---|---|---|
| 3,301,761 | 1/1967 | Johnson et al. | 376/283 |
| 3,459,635 | 8/1969 | Bevilacqua et al. | 376/282 |
| 3,583,479 | 6/1971 | Knutsford et al. | 376/283 |
| 3,718,539 | 2/1973 | West et al. | 376/283 |
| 3,865,688 | 2/1975 | Kleimola | 376/283 |
| 3,889,707 | 6/1975 | Fay et al. | 376/283 |
| 4,050,983 | 9/1977 | Kleimola | 376/283 |
| 4,210,614 | 1/1980 | Kleimola | 376/283 |
| 4,473,528 | 9/1984 | Kleimola | 376/283 |
| 4,505,875 | 3/1985 | Wolters et al. | 376/283 |
| 4,610,840 | 9/1986 | Leach | 376/283 |
| 4,661,312 | 4/1987 | Schweiger | 376/283 |
| 4,664,877 | 5/1987 | Magee et al. | 376/283 |
| 4,687,526 | 8/1987 | Tong | 376/283 |

FOREIGN PATENT DOCUMENTS

| | | | |
|---|---|---|---|
| 61-32637 | 7/1986 | Japan | 376/283 |
| 62-44687 | 2/1987 | Japan | 376/283 |

Primary Examiner—Daniel Wasil
Attorney, Agent, or Firm—Flehr, Hohbach, Test, Albritton & Herbert

[57] ABSTRACT

A self-actuating passive pressure relief device for nuclear reactor containments is described. The pressure relief device passively releases gases from within a reactor containment when the containment pressure exceeds a designated threshold pressure. The pressure relief device automatically reseals itself when the containment pressure drops below the threshold pressure. Any containment gases that are vented by the pressure relief device from the containment are scrubbed and cleansed before they are released into the atmosphere. To accomplish this, a sealed fluid chamber is placed in direct communication with the reactor containment for holding a liquid material such as water. A standpipe having its lower end extend into the sealed container and has an opening below the normal operating liquid level within the chamber. The standpipe acts as a manometer and the liquid level within the sealed chamber is arranged such that when the threshold pressure is reached, the liquid level will fall below an opening in the standpipe thereby allowing containment gases to vent into the standpipe. The vented gases travel upward through the liquid-filled standpipe which serves to scrub the released gases. Steam within the containment gases is condensed and recirculated during prolonged releases, condensed steam is drained back into the containment.

21 Claims, 3 Drawing Sheets

FIG.—3

SELF-ACTUATING PRESSURE RELIEF DEVICE AND METHOD FOR NUCLEAR CONTAINMENT

This is a continuation, of application Ser. No. 231,847 filed 08/12/88, now abandoned, which is incorporated herein by reference.

BACKGROUND OF THE INVENTION

The present invention relates to a pressure relief device for nuclear containments that protects against severe over-pressurization and ultimate failure of nuclear reactor containments.

Nuclear power plants must be designed to ensure that even in the event of accidents, a mechanism will be provided to prevent or minimize the escape of radioactive material and noble gases. To guard against radioactive releases, the reactor system is typically housed within a containment structure that is constructed from steel and reinforced concrete. Thus the containment is capable of withstanding large pressures which may result from various accidents. However, it has been postulated that in severe accidents, the containment vessel itself could fail from gradually increasing over-pressurization. Although the likelihood of such an event is very small, the health risks associated with exposing the surrounding population to the radioactive releases of such an event has led many to believe that a mechanism should be provided to vent the containment structure at or somewhat above the design pressure and to filter the gases released. That is, it is desirable to both provide a pressure release device for the containment vessel and a mechanism for scrubbing any gases that may be released by the containment before they are released into the atmosphere.

To date there have been a wide variety of attempts to provide pressure relief devices for containment structures and/or scrubbers that remove a large percent of the radioactive material from the vented gases before they are released into the atmosphere. For example, in U.S. Pat. No. 3,889,707, Fay, et al. disclose a pressure relief and secondary containment system for preventing the release of radioactive gases. However, such a device has many drawbacks. Initially, the system is completely sealed. In the event of a large pressure increase within the primary containment, a pressure regulator fluid seal is breached, thereby allowing gases to escape into a second containment structure. However, such a system is only capable of storing (and not dissipating) energy, and in effect, works only as a larger containment vessel. Therefore, the device disclosed by Fay is inherently limited by its size. Further, the disclosed system requires extensive modification of existing plants and no provision is made for vacuum relief in the event that the containment vessel experiences a vacuum condition after an original high pressure transient.

U.S. Pat. No. 4,610,840 issued to Leach discloses a fission products scrubbing system for a nuclear reactor. Specifically, a secondary compartment in fluid communication with the containment is partially filled with water. In the event of a large pressure increase, a rupture disk disposed within a vent pipe emanating from the secondary compartment bursts to relieve pressure. When the rupture disk blows, radioactive gases and vapors from the containment pass through the water filled secondary compartment and are then released through the now open vent pipe. As the hot containment gases and vapors (primarily steam) pass through the water stored within the enclosed secondary compartment, a large majority of the fission products will be scrubbed from the containment gases. Therefore, the gases are released from the secondary compartment in a substantially purified state. While such a system reduces the radioactivity of the materials released, once the rupture disk has been broken, the system will not seal itself and thus substantially all of the gases within the containment vessel will escape even after a brief pressure transient.

In U.S. Pat. Nos. 3,865,688, 4,050,983, 4,210,614, and 4,473,528, Kleimola discloses various embodiments of passive containment systems for protecting against loss of coolant accidents in pressurized water or boiling water type nuclear reactors. The passive containment system described consists of plurality of interconnected cells, each housing a major component of the reactor. In the event of a loss of coolant accident, the containment system attempts to absorb all of the energy released by the nuclear fuel. While such an arrangement may possibly serve to protect against any loss of coolant accident, the proposed solution requires a complete redesign of present nuclear reactors and would be far more complex and costly than desired.

SUMMARY OF THE INVENTION

Therefore, it is a primary objective of the present invention to provide an improved self-activated pressure relief device for nuclear reactor containments that relieves containment over-pressure yet maintains containment pressure at or below a pre-established level by resealing the containment after a pressure release.

Another objective of the present invention is to provide a mechanism for scrubbing any released gases.

A further objective of the invention is to accomplish controlled pressure relief without reliance on the availability of power or any mechanical or electrical device and without requiring operator action, relying instead only on inherent responses to well-known physical laws.

Another particular objective of the invention is to assure continued ability to maintain the resealing and scrubbing functions of the device throughout an indefinite period of release by means of inherent and passive heat removal and resultant condensation of steam produced during the course of the accident.

Another objective of the invention is to recycle condensate to the reactor containment during extended releases to remove residual heat from core debris.

Another objective of the invention is to provide a pressure relief device that may be appended to current reactor systems without requiring significant changes in the construction of the reactor containment building.

To achieve the foregoing and other objects and in accordance with the purpose of the present invention, a passive self-actuated pressure relief device is provided for nuclear reactor containments. The pressure relief device includes a release means for passively releasing gases within the reactor containment when the containment pressure exceeds a designated threshold pressure. The release means reseals when the containment pressure drops below the threshold pressure. A scrubbing mechanism is provided for cleansing the released gases before they are released into the atmosphere.

An embodiment for accomplishing the foregoing includes a sealed chamber in direct communication with the reactor containment for holding a liquid material such as water. A standpipe is provided that has its lower end extending into the sealed chamber and has a first opening disposed below the normal operating liquid level within the sealed chamber. In effect, the standpipe acts as a manometer wherein when the containment pressure begins to rise, liquid is forced up the standpipe. The first standpipe opening is positioned such that when the threshold pressure is reached, the liquid level within the sealed chamber has fallen to or below the opening of the standpipe, thereby allowing containment gases to vent into the standpipe. The vented gases travel upward through the liquid filled standpipe which serves to scrub the vented gases. The cleansed gases are released while the liquid is recirculated through a recirculation means, thereby containing the scrubbed radioactive materials in the circulating liquid.

In a preferred embodiment, the pressure relief device includes a mixing chamber attached to the top end of the standpipe for collecting a liquid. The recirculation means includes a plurality of recirculating drainpipes for transporting liquid between the mixing chamber and the sealed chamber. The recirculating drainpipes also serve to cool the transported liquids. Thus, when gases are released into the standpipe, a circulation path is established about a loop defining the standpipe, the mixing chamber, the recirculating drainpipes and the sealed chamber.

BRIEF DESCRIPTION OF THE DRAWINGS

The features of the present invention that are believed to be novel are set forth with particularity in the appended claims. The invention, together with other objects and advantages thereof, may best be understood by reference to the following description taken in conjunction with the accompanying drawings in which:

DETAILED DESCRIPTION OF THE PREFERRED EMBODIMENT

Figure 1:
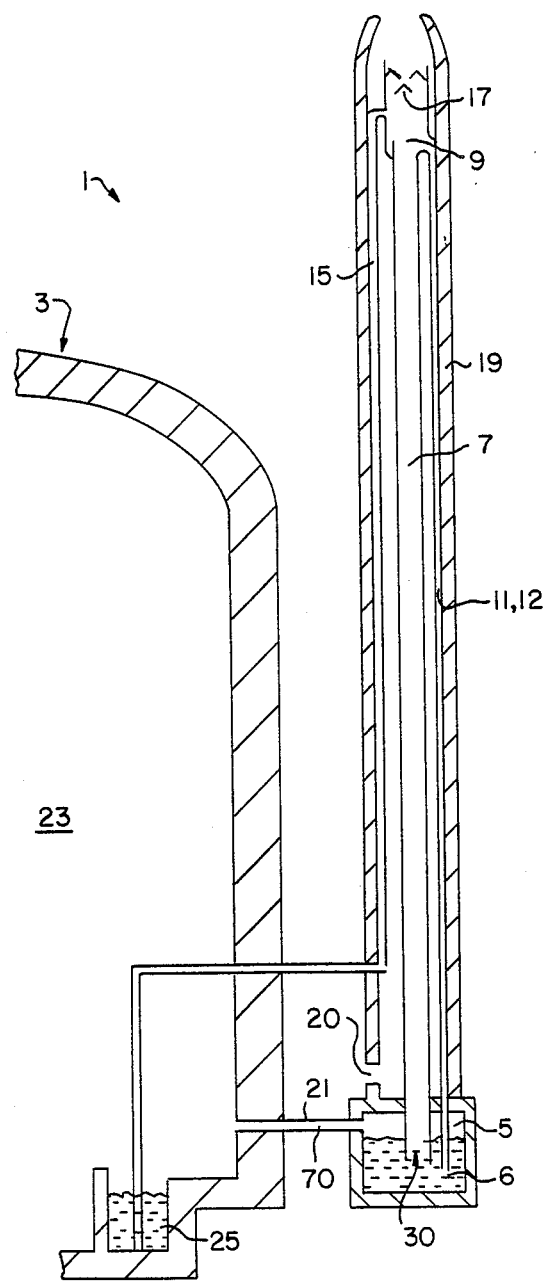
FIG. 1 is a schematic cutaway side view of a pressure relief device in accordance with the present invention, wherein the containment is at its normal pressure.
Figure 2:
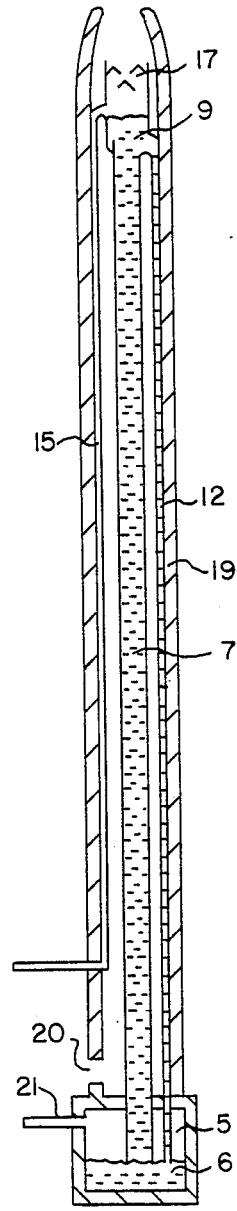
FIG. 2 is a schematic cutaway side view of the pressure relief device shown in FIG. 1 with the containment pressure increased sufficiently to induce venting.

As illustrated in the drawings, with particular reference to FIGS. 1-2, an embodiment of the pressure relief device 1 for containment 3 includes a sealed chamber 5, a standpipe 7, a mixing chamber 9, recirculation means 11 in form of recirculating drain(s) 12, overflow drain 15, moisture separators 17, chimney 19, and piping 21.

Referring initially to FIGS. 1 and 2, the containment 3 includes a large sealed chamber 23 having a sealing liquid reservoir 25 and a nuclear reactor (not shown), disposed therein. The self-actuating passive pressure relief device 1 for the containment 3 includes a sealed chamber 5 in communication with the containment chamber 23. Although, in the embodiment described, seal chamber 5 is in direct communication with containment chamber 23, it should be appreciated, that should the requirements of a particular design warrant, a muffling device 70, may be inserted within piping 21 to ensure that sudden pressure surges within the containment chamber 23 do not affect the seal chamber 5. To accomplish such a function, a wide variety of conventional muffling devices and/or their equivalent could be provided.

A liquid, such as water is placed within sealed chamber 5. A standpipe 7 extends vertically upward from the sealed chamber. The bottom end of standpipe 7 opens into the sealed chamber below the normal operating liquid level within chamber 5. Since both containment chamber 23 and sealed chamber 5 are sealed to prevent the escape of gases, standpipe 7 acts as a manometer. Thus, if an accident occurs that releases steam and/or hot gases into the containment chamber 23, the pressure within both the containment chamber 23 and the sealed chamber 5 will increase, thereby forcing water within sealed chamber 5 upward into the standpipe. The sealed chamber and standpipe are arranged such that when a designated threshold pressure is encountered within containment chamber 23, the standpipe will vent containment gases to avoid over-pressurization of the containment chamber 23. This is accomplished by positioning an opening 30 in the lower portion of the standpipe within sealed chamber 5 such that when the designated threshold pressure is reached, the liquid level within sealed chamber 5 will drop to slightly below the lower openings 30 in standpipe 7.

In the event that the threshold pressure is ever actually achieved, the containment gases would begin to enter the standpipe. Since the density of the gases is much lighter than that of the liquid (water) within standpipe 7, the containment gases will rise within the standpipe. The upper end of the standpipe 7 opens into a mixing chamber 9. The mixing chamber 9 is provided with moisture separator 17 and is open to the atmosphere. It should be appreciated that as containment gases pass upwardly through the standpipe, they are mixed with the water carried within the standpipe. The resultant two-phase flow tends to scrub a large percentage of the radioactive materials from the escaping containment gases before they enter mixing chamber 9. The escaping containment gases are also cooled by the chamber liquid 6 as they pass through the standpipe. The surface of the mixing chamber liquid will be quite turbulent due to the bubbling of non-condensible gases. Therefore, moisture separators 17 are disposed above mixing chamber 9 to ensure that a substantial percentage of any entrained water droplets within the escaping containment gases are physically separated and drained back to the water surface in the mixing chamber before the gases are released into the environment. The scrubbed and dried containment gases including uncondensed steam then pass upwardly out of the mixing chamber 9 and are released into the environment.

Condensing the steam accomplishes two important functions. Initially, the steam escaping from the containment structure carries radioactive materials and thus, their condensation reduces the radioactive release. Secondly, as will be described in more detail below, condensation allow the pressure relief device to maintain the coolant level within the containment cooling liquid reservoir 25 which protects against loss of coolant in the event of a prolonged accident. Collecting the condensate also insures that the pressure relief device itself does not lose water, which would prevent the device from resealing. Any excess condensate not required for these purposes is returned to the containment vessel where it is available to cool any reactor fuel which may have escaped from the reactor.

Figure 4:
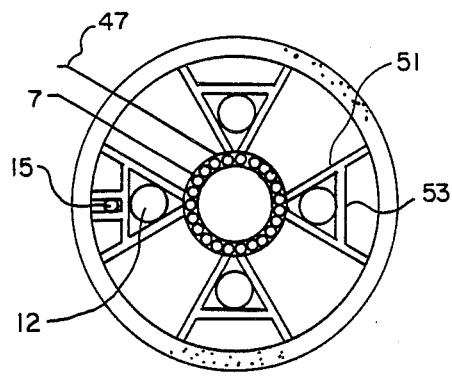
FIG. 4 is a cross sectional view of the cooling tower shown in FIG. 3 taken along line 4A—4A of FIG. 3.
Figure 5:
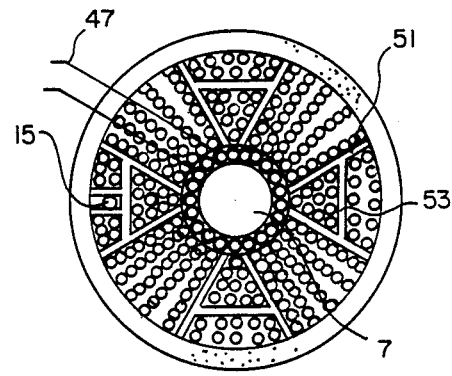
FIG. 5 is a cross sectional view of an alternative embodiment of the pressure relief device taken at the same point along the cooling tower as the view shown in FIG. 4.

To ensure that sufficient cooling will take place to prevent loss of water from the pressure relief device during prolonged accidents, a recirculation means 11 is provided for recirculating chamber water 6 from the mixing chamber 9 into the sealed chamber 5. As can be seen in FIGS. 4 and 5, the recirculation means 11 may take the form of a plurality of drain pipes 12. The recirculating drain pipes 12 open into sealed chamber 5 at a position below the lower openings 30 in standpipe 7. The drain pipes 12 are designed to allow the circulating water to cool as it returns from mixing chamber 9 to sealed chamber 5. It should be appreciated that when venting occurs, the sealed chamber 5, the standpipe 7, the mixing chamber 9 and the drainpipes 12 will cooperate to form a circulatory liquid flow path. Since the drainpipes 12 empty into the sealed chamber below the level of openings 30 and standpipe 7, hot container gases do not enter the drainpipes, thus, the circulatory flow is induced by two components. Initially, as hot gases enter the standpipe, the density of the water column within the standpipe will decrease relative to the density of the water column within the drainpipes. Secondly, the temperature of the water within the drainpipes will be cooled relative to the water within the standpipe by an updraft of air in the surrounding chimney, thus further amplifying the density differential and thermally inducing a circulatory flow.

The described structure has several advantages over prior art pressure relief devices. Importantly, many postulated reactor accident scenarios envision a ramped increase in containment chamber pressure which is ultimately followed by cooling, and thus lower expected pressures within the containment chamber. The standpipe arrangement described effectively reseals the containment chamber after venting has occurred since if the pressure within the containment chamber falls below the designated threshold containment chamber pressure, then the liquid level within the sealed chamber 5 would rise sufficiently to cover lower openings 30 in the standpipe 7. When this occurs, the containment chamber is effectively resealed.

A substantial cause of concern relating to nuclear power plant design is the unlikely occurrence of a loss of coolant accident. In such an accident, if the coolant lost from the reactor system cannot be replaced, the reactor core can melt and penetrate the reactor vessel and fall to the containment floor. The potential radioactive release emitted under such circumstances is far greater than any other postulated accident scenario. The present invention can be designed to provide ample water to cool the reactor fuel even following the circumstances described. Specifically, an overflow drain 15 is provided that operates between the mixing chamber 9 and sealing reservoir 25. In the event that the pressure relief device is caused to vent containment gases for a prolonged time, the liquid level within mixing chamber 9 would rise due to the condensation of steam escaping from the containment 23 within mixing chamber 9. An overflow drain 15 is provided for carrying liquid between the mixing chamber 9 and the sealing reservoir 25. The entrance to overflow drain 15 within the mixing chamber is disposed above both the top standpipe openings and the top of the recirculating drains. As the mixing chamber begins to fill during a prolonged accident, the liquid level within the mixing chamber would rise above the entrance to overflow drain 15 thereby allowing liquid to be recirculated from the mixing chamber 9 to the containment sealing reservoir 25. This water would overflow the sealing reservoir and be directed to the sump beneath the reactor vessel where it would cool any core debris which might be present.

During normal operation of the nuclear power plant, the riser 7 is sealed by submersion of its lower end in water contained within sealed chamber 5. The sealed chamber communicates directly with the containment 3. During a containment over-pressurization transient hot steam and various gases will be released by the reactor. The resultant pressure rise within the containment forces water within the sealed chambers upward into the riser 7. The volume of the water within the sealed chamber 5 above the lower openings 30 of standpipe 7 is balanced such that when the designated threshold pressure is reached within the containment, sufficient chamber water 6 has been forced upward into riser 7 and recirculating drainpipes 12 so that the openings 30 in riser 7 are uncovered sufficiently to allow bubbles of containment gases (including both air and steam) to enter the riser. Since the containment gases have a lower density than the containment water, the bubbles will float upwardly through the standpipe. The vapors entering the standpipe will either be condensed as they travel therethrough, or will be released from the upper end of the standpipe. The vapors escaping from the upper end of the standpipe will have to pass through the moisture separator 17 which is designed to remove a substantial percentage of any entrained water droplets. Major fractions of the released particulate matter and elements having an affinity for water will be retained by the water within the standpipe. Only air from the containment and non-condensible gases such as Krypton and Xenon will be released without major retention within the pressure relief device 1.

If the over-pressurization transient in the containment continues, more steam (from the original reactor cooling fluid) will condense than is lost. In such an event, the liquid level within mixing chamber 9 will begin to rise. As the mixing chamber fills, the level will slowly rise above the opening for overflow drain 15. When this occurs, since the column of water in the overflow drain is longer than the column within the pressure relief device, a siphon effect will cause a fluid flow downward into the containment sealing reservoir 25. With such an arrangement, water will flow only from the mixing chamber towards the containment.

The overflow drain serves to protect against loss of water from the containment during prolonged over-pressurizations. Without recirculating fluids back into the containment, it is possible that the reactor heat could evaporate all of its cooling liquid, thereby magnifying the scope of the accident. Water returned to the containment via overflow drain 15 can be used to maintain a pool underneath the reactor vessel for whatever uses may be required until conditions are ultimately returned to normal.

It should be appreciated when an over-pressurization is finally relaxed, the liquid level within sealed chamber 5 will rise above the lower openings 30 and standpipe 7 and thereby reseal the device. In the event that a negative pressure is formed within the containment (as for example, by condensation of steam), then the described system will function as a vacuum breaker allowing outside air to bubble through the riser and the sealed chamber into the containment 3. Of course, the system would immediately reseal when the pressures are equalized.

A chimney 19 is provided to protect, support and shield the standpipe, the mixing chamber and the moisture separators from exposure to the elements. The chimney also forms a shield for radioactive materials carried by the chamber liquid. The chimney has an opening at its top to allow vented gases to escape. An inlet 20 is provided at the base of chimney 19 to provide a substantial flow of fresh air into the chimney. As the standpipe and drains begin to heat up, the transfer of that heat to the air in the concrete chimney 19 will establish a natural draft wherein air enters the chimney 19 at air inlet 20. The natural draft will continue to cool the standpipe and the recirculating drainpipes during any prolonged over-pressure transient. It should also be understood that the draft of air leaving the top of the chimney serves to dilute the released gases and to carry them higher into the atmosphere due to the elevated temperature of the plume.

In practice, the design parameters for a particular pressure relief device will depend heavily upon the design of the reactor and containment system which the pressure relief device will vent. Initially, the venting pressure must be selected. Most designers seem to feel that threshold pressures in the range of 40 to 80 psia are appropriate. By way of example, if a vent-opening pressure of 60 psia is selected, the column of water that must be raised in the standpipe before opening occurs will be approximately 104 feet.

Figure 3:
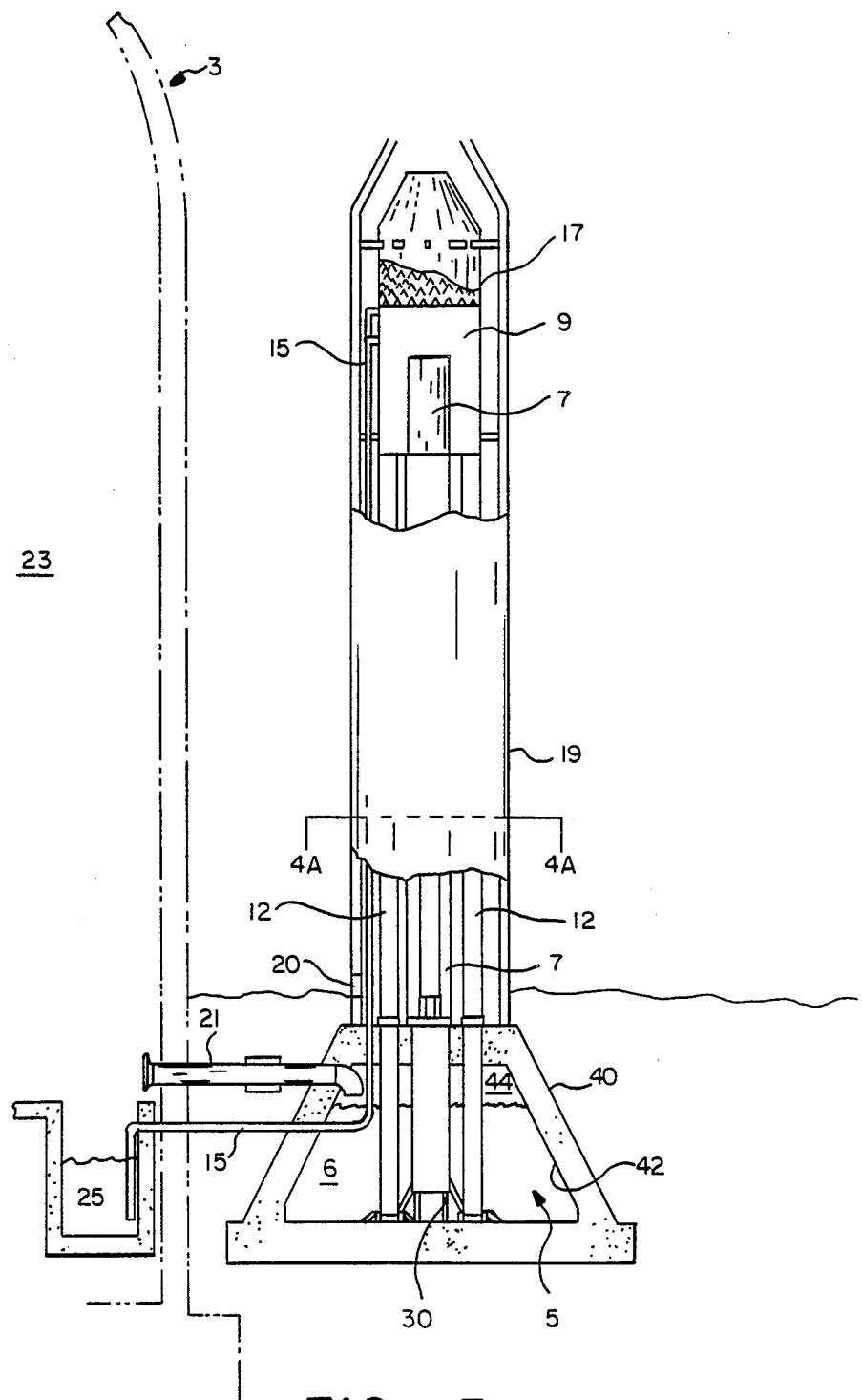
FIG. 3 is a diagrammatic partially broken away side view of a pressure relief device in accordance with the present invention.

Referring next to FIG. 3, sealed chamber 5 may take the form of a conical concrete water reservoir 40 lined with a stainless steel liner 42. Concrete reservoir 40 is substantially buried. Inlet piping 21 couples containment chamber 23 to an airspace 44 within sealed chamber 5. The piping 21 is also buried underground so that in the event of an accident, it remains unexposed. Standpipe 7 and recirculating drainpipes 12 extend upwardly out of the sealed chamber 5 within the draft chimney 19. The chimney itself is substantially higher than either the standpipe or the recirculating drains. Standpipe 7 may be open ended at its top such that when venting occurs, any overflowing fluids spill freely into mixing chamber 9. The standpipe extends well into the mixing chamber, while recirculating drains 12 are coupled to the bottom of the mixing chamber.

When venting occurs, the water carried within sealed chamber 5 and standpipe 7 will be at ambient temperature and therefore sub-cooled. As steam and hot gases are bubbled through the liquid water, some steam will condense and heat will be transferred from the other gases into the chamber water. Therefore the temperature within the standpipe will begin to rise once venting occurs. If the standpipe and drainpipes were insulated, the water temperature would eventually reach saturation and the water column would gradually evaporate. Additionally, any steam carried by the venting containment gases would exit directly into the atmosphere. To prevent such an occurrence, the standpipe and drainpipes are designed to reject sufficient heat to at least maintain the water inventory in the recirculating system, providing additional heat transfer surface can assure that a substantial percentage of the steam that is vented into the standpipe will be condensed. It will be appreciated that a conventional thermodynamic analysis can be performed to determine the extent of heat transfer that must be provided for the standpipe and recirculating drains to insure that adequate cooling is provided for a given system.

To enhance dissipation of excess heat, the standpipe 7 may be outfitted with cooling fins 47. In practice, a wide variety of fin designs may be provided. By way of example quarter inch thick aluminum plates that are eight inches wide and twelve inches high would work well when mounted directly to the standpipe.

The standpipe is supported by a plurality of A-shaped support frames 49. Each A-shaped support frame 49 includes a pair of splayed support member 51 that extend between standpipe 7 and a reinforced concrete chimney stack 19. Additionally, in the embodiments shown in FIGS. 3 and 4, splayed support members 51 firmly engage a drainpipe to support it in place. The A-shaped support frame 49 also includes a cross member 53 disposed between the two splayed support members 51. The cross member 53 also engages drainpipes 12.

The extent to which particulate matter will be scrubbed from the vented containment gases will depend to some extent on the size of the bubbles traveling through the riser column. Better scrubbing will result if the bubbles are small and/or are continually broken up and reformed. For this reason, it is desirable to keep the two phase flow in the riser within a turbulent flow regime even under the largest mass flow rates. If the diameter of the column is too small for a given containment gas flow rate, slug flow (in which the bubbles are as wide as the column and gasliquid contact is poor) will result. Usually, slug flow will be avoided if the void fraction in the column is kept below 0.4 during operation. Thus, the appropriate standpipe diameter will be a function of the expected two phase flow characteristics within the standpipe when the containment is being vented. By way of example, a six foot diameter standpipe would be appropriate for a medium sized power plant.

Figure 6:
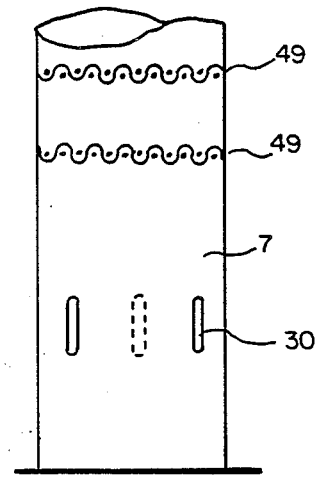
FIG. 6 is a diagrammatic side view of the embodiment portion of a standpipe in accordance with the present invention.

It has been determined that the geometry of the lower openings 30 has some impact on the bubble size within the standpipe. Specifically, a single elongated slot as shown in FIG. 6 provides much smaller bubbles within the standpipe than a plurality of annular holes. Baffles 49 are disposed within the standpipe to further reduce the bubble size. By way of example, a mesh screen provides a suitable baffle arrangement.

The number and diameter of the recirculating drainpipes should be such that their combined flow area is substantially the same as that of the standpipe 7. In the embodiment shown in FIGS. 3 and 4, four drainpipes are used. Thus, by way of example, if a 6.0 foot diameter standpipe is used, four 3.0 foot diameter drainpipes would be appropriate. It will be appreciated that any number of drainpipes may be used. In practice, there are substantial advantages to using a large number of drainpipes. Specifically, a larger number of drainpipes would enhance the heat transfer characteristics of the recirculation means 11. An alternative embodiment of the recirculation means utilizes a large number of aluminum drainpipes 51 in place of the four 3 foot diameter recirculating drains shown in FIG. 4. Referring now to FIG. 5, it will be appreciated that a large number of drainpipes may be used to increase the heat transfer area of the recirculation means. The drainpipes are spaced apart sufficiently to allow air to pass between adjacent pipe rows. By way of example, approximately 5000 one inch diameter aluminum tubes would be appropriate for use with the six foot diameter standpipe described above. Aluminum pipes are chosen for their good heat transfer properties.

Although only a few embodiments of the present invention have been described in detail, it should be understood that the present invention may be embodied in many other specific forms without departing from the spirit or scope of the invention. Particularly, it should be understood that the sizing and placement of the various components, as well as the design liquid levels may be widely varied within the scope of the present invention. For example, it should be appreciated that the standpipe could be designed such that venting occurs either before or after liquids spill from the standpipe into the mixing chamber. The actual operating fluid levels and normal water lines as well as the geometry of the sealed container may be widely varied to accomplish the purposes described herein.

It should also be appreciated that multiple standpipes could be provided in place of the single standpipe described. As indicated above, any number of recirculating drains may be used. The actual design will be a function of costs and the amount of heat that is to be rejected for a particular application. Further, it should be appreciated that the actual containment pressure at which venting occurs may be widely varied by merely altering the amount of liquid that must enter the standpipe before the lower standpipe opening can become exposed. This, of course, may be accomplished by either altering the liquid level, the placement of the standpipe holes, and/or the volume of the sealed chamber.

It should also be appreciated that, although the selfactuated pressure relief device depicted herein is shown in relationship to a pressurized water reactor within a large dry containment vessel, the device is equally adaptable for use in association with other water-cooled nuclear reactors such as boiling water reactors and/or with other containment arrangements and designs, such as ice containments and socalled pressure suppression containments. Therefore, the present examples and embodiments are to be considered as illustrative and not restrictive, and the invention is not to be limited to the details given herein, but may be modified within the scope of the appended claims.

I claim:

1. A self-actuating pressure relief device for nuclear reactor containments comprising:
   a sealed chamber in direct communication with the reactor containment for holding a liquid material, the liquid within the sealed chamber having a normal operating liquid level;
   an extended standpipe in fluid communication with the interior of the sealed chamber, the standpipe having a first opening within the sealed chamber at a position below the normal operating liquid level and a second opening outside of and substantially above the sealed chamber;
   recirculating means in fluid communication between the second standpipe opening and the sealed chamber for cooling and recirculating liquids carried by the standpipe back into the sealed chamber, the recirculating means having a first fluid port within the sealed chamber at a position below the first standpipe opening;
   whereby the normal operating liquid level within the sealed chamber is chosen to insure that when the pressure within the reactor containment surpasses a designated threshold pressure, sufficient liquid will be forced from the sealed chamber into the standpipe to cause the liquid level within the sealed chamber to fall below the first standpipe opening thereby allowing containment gases to escape from the sealed chamber into the standpipe.

2. A self-actuating pressure relief device as recited in claim 1 wherein said recirculating means includes a mixing chamber in fluid communication with the second standpipe opening and carried by the standpipe substantially above the sealed chamber.

3. A self-actuating pressure relief device as recited in claim 2 wherein said recirculating means further includes a plurality of recirculating drainpipes for transporting liquid between said mixing chamber and said sealed chamber and cooling the transported liquid.

4. A self-actuating pressure relief device as recited in claim 2 wherein said sealed chamber, said standpipe, the mixing chamber and the cooling means cooperate to form a circulatory liquid flowpath during prolonged containment venting.

5. A self-actuating pressure relief device as recited in claim 2 further comprising a moisture separator in communication with the mixing chamber for reducing escape of entrained water droplets from the mixing chamber.

6. A self-actuating pressure relief device as recited in claim 3 wherein the containment has a sealing water chamber within the reactor containment, the pressure relief device further comprising an overflow drain in fluid communication between said mixing chamber and the sealing water chamber for passing liquid into the sealing water chamber and the containment in the event of a sustained pressure release.

7. A self-actuating pressure relief device as recited in claim 3 wherein said cooling means included a multiplicity of recirculating drain pipes.

8. A self-actuating pressure relief device as recited in claim 7 wherein said standpipe has cooling fins.

9. A self-actuating pressure relief device as recited in claim 8 wherein there are at least 1000 drain pipes.

10. A self-actuating pressure relief device as recited in claim 3 further comprising a protective chimney for receiving said standpipe and recirculation means, the chimney having an air inlet near its base and a top opening disposed above the top of the standpipe for allowing air to circulate about the standpipe and recirculation means.

11. A self-actuating pressure relief device as recited in claim 10 further comprising a moisture separator for capturing water droplets that escape from the recirculation means wherein said moisture separator opens into the cooling tower to allow scrubbed gases to escape when the device releases pressure.

12. A self-actuating pressure relief device as recited in claim 1 further comprising baffles disposed within said standpipe for breaking up bubbles within the standpipe to enhance scrubbing of the gases that form the bubbles.

13. A passive pressure relief device for a nuclear reactor containment having a liquid coolant, the pressure relief device comprising:
   release means for passively releasing gases within the reactor containment to the atmosphere when the containment pressure exceeds a designated threshold pressure, said release means resealing when the containment pressure drops below the threshold pressure, the release means including a chamber for holding the liquid coolant, the coolant within the chamber having a normal operating liquid level;

scrubbing means disposed externally of the containment for passively scrubbing the released containment gases before they are released into the atmosphere, the scrubbing means including an extended standpipe in fluid communication with the chamber, the standpipe having a first opening within the chamber at a position below the normal operating liquid level and a second opening outside of and substantially above the chamber; and recirculation means for recycling coolant that escapes from the contaiment with the released gases back into the containment after the escaped coolant passes through said scrubbing means.

14. A pressure relief device as recited in claim 13 wherein said release means also releases air into the reactor containment in the event of a significant vacuum transient therein.

15. A pressure relief device as recited in claim 13 further comprising piping means for coupling said chamber to the reactor containment, said piping means including a muffling device to limit the effect of potential rapid energy releases within the reactor containment of the pressure relief device.

16. A pressure relief device as recited in claim 13 wherein said scrubbing means further includes baffles disposed within said standpipe for breaking up bubbles within the standpipe to enhance scrubbing of the gases that form the bubbles.

17. A pressure relief device as defined in claim 13 wherein said recirculation means is in fluid communication between a second standpipe opening disposed substantially above the sealed chamber and the sealed chamber, the recirculation means for recirculating liquids carried by the standpipe back into the sealed chamber, the recirculation means having a first fluid port within the sealed chamber, wherein said first fluid port is positioned below the first standpipe opening.

18. A pressure relief device as recited in claim 17 wherein said recirculation means further includes a mixing chamber in fluid communication with the second standpipe opening and carried by the standpipe substantially above the sealed chamber.

19. A passive self-actuating pressure relief device for nuclear reactor containments having a sealing water chamber for holding water for cooling the reactor core in the event of an accident, the pressure relief device comprising:

a sealed chamber for holding a liquid material, the liquid within the sealed chamber having a normal operating liquid level;

piping means for coupling said sealed chamber to the reactor containment;

an extended standpipe in fluid communication with the interior of said sealed chamber, the standpipe having a first opening within the sealed chamber at a position below the normal operating liquid level and a second opening outside of and substantially above the sealed chamber;

a mixing chamber in fluid communication with the second standpipe opening and carried by the standpipe substantially above the sealed chamber;

a multiplicity of recirculating drain pipes for transporting liquid between said mixing chamber and said sealed chamber and cooling the transported liquid;

a moisture separator in communication with the mixing chamber for trapping water droplets that escape from the mixing chamber; and an overflow drain in fluid communication between said mixing chamber and the reactor containment sealing water chamber;

whereby the normal operating liquid level within the sealed chamber is chosen to insure that when the pressure within the reactor containment surpasses a designated threshold pressure, sufficient liquid will be forced from the sealed chamber into the standpipe to cause the liquid level within the sealed chamber to fall below the first standpipe opening thereby allowing containment gases to escape from the sealed chamber into the standpipe.

20. A self-actuating passive pressure relief device as recited in claim 19 further comprising cooling fins for said standpipe.

21. A self-actuating passive pressure relief device as recited in claim 19 further comprising baffles disposed within said standpipe for breaking up bubbles within the standpipe to enhance scrubbing the gases that form the bubbles.

* * * * *